(12) United States Patent
Lansel et al.

(10) Patent No.: US 12,271,995 B2
(45) Date of Patent: Apr. 8, 2025

(54) COMPOSITOR LAYER EXTRAPOLATION

(71) Applicant: Meta Platforms Technologies, LLC, Menlo Park, CA (US)

(72) Inventors: Steven Paul Lansel, Apopka, FL (US); Guodong Rong, Saratoga, CA (US); Jian Zhang, Fremont, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 84 days.

(21) Appl. No.: 18/048,602

(22) Filed: Oct. 21, 2022

(65) Prior Publication Data

US 2023/0128288 A1 Apr. 27, 2023

Related U.S. Application Data

(60) Provisional application No. 63/272,566, filed on Oct. 27, 2021.

(51) Int. Cl.
*G06T 15/50* (2011.01)
*G06F 3/01* (2006.01)
(Continued)

(52) U.S. Cl.
CPC ............ *G06T 15/503* (2013.01); *G06F 3/012* (2013.01); *G06T 1/60* (2013.01); *G06T 3/18* (2024.01);
(Continued)

(58) Field of Classification Search
CPC .......... G06T 15/503; G06T 3/18; G06T 5/80; G06T 1/60; G06T 15/20; G06T 19/006;
(Continued)

(56) References Cited

U.S. PATENT DOCUMENTS 11,503,270 B1 * 11/2022 Timonen ................ G06T 19/006
2017/0018121 A1 * 1/2017 Lawson .................. G06V 40/10
(Continued)

OTHER PUBLICATIONS

International Search Report and Written Opinion for International Application No. PCT/US2022/048021, mailed Feb. 21, 2023, 14 pages.

(Continued)

*Primary Examiner* — Yu Chen
(74) *Attorney, Agent, or Firm* — Morgan, Lewis & Bockius LLP

(57) ABSTRACT

In one embodiment, a method may obtain, from an application, (a) an image and (b) a layer frame having a first pose in front of the image. The method may generate, for a first viewpoint associated with a first time, a first display frame by separately rendering the image and the layer frame having the first pose into a display buffer. The method may display the first display frame at the first time. The method may determine an extrapolated pose for the layer frame based on the first pose of the layer frame and a second pose of a previously submitted layer frame. The method may generate, for a second viewpoint associated with a second time, a second display frame by separately rendering the image and the layer frame having the extrapolated pose into the display buffer. The method may display the second display frame at the second time.

20 Claims, 14 Drawing Sheets

(51) Int. Cl.
  *G06T 1/60* (2006.01)
  *G06T 3/18* (2024.01)
  *G06T 5/80* (2024.01)
  *G06T 15/20* (2011.01)
  *G06T 19/00* (2011.01)
  *G06T 19/20* (2011.01)

(52) U.S. Cl.
  CPC .............. *G06T 5/80* (2024.01); *G06T 15/20* (2013.01); *G06T 19/006* (2013.01); *G06T 19/20* (2013.01); *G06T 2219/2016* (2013.01)

(58) Field of Classification Search
  CPC .. G06T 19/20; G06T 2219/2016; G06F 3/012
  See application file for complete search history.

(56) References Cited

U.S. PATENT DOCUMENTS

| | | | | |
|---|---|---|---|---|
| 2017/0243324 | A1* | 8/2017 | Mierle | G06T 15/005 |
| 2018/0211638 | A1* | 7/2018 | Ozguner | G06F 12/0862 |
| 2018/0275748 | A1* | 9/2018 | Haraden | G06T 15/503 |
| 2018/0276824 | A1* | 9/2018 | Haraden | G06T 3/20 |
| 2019/0333263 | A1* | 10/2019 | Melkote Krishnaprasad | G06F 3/012 |
| 2020/0302682 | A1* | 9/2020 | Aksoy | G06T 19/006 |
| 2020/0410740 | A1* | 12/2020 | Croxford | G06T 7/251 |
| 2021/0258555 | A1 | 8/2021 | Leiby | |
| 2022/0189095 | A1* | 6/2022 | Hauswiesner | G06T 7/11 |
| 2022/0230327 | A1* | 7/2022 | Croxford | G06T 1/20 |

OTHER PUBLICATIONS

Antonov, Michael, "Asynchronous Timewarp Examined", <https://developer.oculus.com/blog/asynchronous-timewarp-examined/>, Mar. 2, 2015.

Zhang et al., "Introducing Application Space Warp", <https://developer.oculus.com/blog/introducing-application-spacewarp/>, Nov. 11, 2021.

Rong et al., "AppSW Enhancements with DirectProjection and Compositor Layer Space Warp", <https://developer.oculus.com/blog/appsw-enhancements-with-directprojection-and-compositor-layer-spacewarp/>, Dec. 14, 2021.

International Preliminary Report on Patentability for International Application No. PCT/US2022/048021, mailed May 10, 2024, 13 pages.

* cited by examiner

COMPOSITOR LAYER EXTRAPOLATION

PRIORITY

This application claims the benefit under 35 U.S.C. § 119(e) of U.S. Provisional Patent Application No. 63/272,566, filed 27 Oct. 2021, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), an extended reality (ER), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of using extrapolation algorithms to generate compositor layers for extrapolated frames. In particular, a compositor layer is a layer intended to occupy a subset of the device's field, such as a layer frame including a menu or a pane, and then combined with additional layers to make a display frame. For example, a compositor layer can be a quad layer or a cylindrical layer depending on pixels per degree (PPD), size of virtual screen, viewing distance, and resolution, and other factors. PPD is a measure of the number of pixels in a certain view angle. PPD can be used to describe the sharpness and clarity for different types of displays associated with AR/VR systems. Usually, the AR/VR systems obtain an image, such as a two-dimensional (2D) image, which can be stored in the eye buffer. When the AR/VR systems generate an eye buffer that contains a surface (such as a panel) with a 2D texture mapped onto it, the compositor that warps the image to present to the viewer a physically consistent experience (for example by compensating for lens distortion and head movement), the resultant display frame to feed to the display pipeline with final output on the display, the 2D texture suffers a low resolution due to double aliasing. Likewise, it is difficult to display layers that need to be very crisp for the user such as menus or panels with fine. The conventional approach is to map the layer's texture into the eye buffer. However, the conventional approach has several short-comings: (1) the eye buffer content is stored at a low PPD, (2) if the layer frame is baked into the scene, then the portion of the scene occluded by the layer frame can not be recoverable when the user's viewpoint changes slightly, (3) because content in the eye buffer is sampled twice, it further decreases its resolution due to double sampling (leading to double aliasing). The compositor layer can effectively increase the PPD of the layer frame by submitting the layer frame separately from the content, such as the eye buffer. As a result, the compositor can separately render the multiple into the display buffer to provide improved PPD and avoid the occlusion issue.

Because AR/VR headsets are power constrained, it is inefficient and expensive to render every frame at a desired frame rate. Therefore, the AR/VR systems may render only half the desired frame rate and extrapolate the in-between frames to allow longer time to render each frame and elongate battery life associated with the AR/VR systems. For example, the AR/VR system can render 30 frames per second (fps) and extrapolate the in-between frames to make the system display 60 fps. As another example, the AR/VR systems render a scene into a 2D image and store it in an eye buffer having a pose at time M. The pose includes a translation and an orientation to describe the relationship between two spaces. By the time the eye buffer is displayed at time N, the head of the user can move to a different pose. Thus, the 2D image in the eye buffer can be adjusted for head rotation such as by using Asynchronous TimeWarp (ATW). Likewise, the 2D image in the eye buffer can be warped to account for geometric distortion caused by the artificial reality lens. For the extrapolated frames, such as frame N+1, the content in the eye buffer, such as the 2D image, is updated in a similar fashion to account for the user's viewpoint at that time. Since more time has elapsed, objects in the scene can also move around. For example, a ball in the scene that is tossed can travel between time N and time N+1. To account for object movements, the AR/VR systems apply methods such as Asynchronous SpaceWarp (ASW) to move the objects in the 2D image for example in a linear motion according to motion vectors. By the time the eye buffer is displayed at time N+1, the head of the user can change the pose. Thus, the AR/VR systems can apply ATW to adjust the 2D image in the eye buffer for head rotation and warp the 2D image to account for geometric distortion caused by the artificial reality lens.

The AR/VR systems can also apply ATW to adjust a layer frame having a first pose for head rotation. The AR/VR systems can also warp the layer frame to account for geometric distortion caused by the artificial reality lens. In particular, the AR/VR systems apply a motion extrapolation algorithm to determine an extrapolated pose for the layer frame for an extrapolated frame based on the first pose of the layer frame, such as pose at time M, and a second pose of a previously-submitted layer frame, such as pose at time M−1. For example, under the assumption of a linear or constant velocity, the AR/VR systems may introduce acceleration to update the pose of the layer frame. The content of the layer frame at time N+1 can be the same as what was submitted at time N or updated with newer content if the message can change from time N to N+1. The AR/VR systems can apply ATW and ASW to the text content of the layer frame to account for the user's viewpoint at that time. The AR/VR systems can warp the text to account for geometric distortion caused by the artificial reality lens. Likewise, the AR/VR systems can generate a compositor layer by submitting separately the texture content of the layer frame from the 2D image in the eye buffer. For example, if there are one eye buffer and 5 panes, the AR/VR systems can submit a total of 6 warping operations. The warped results are then combined by the compositor into a final display frame at time N+1.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
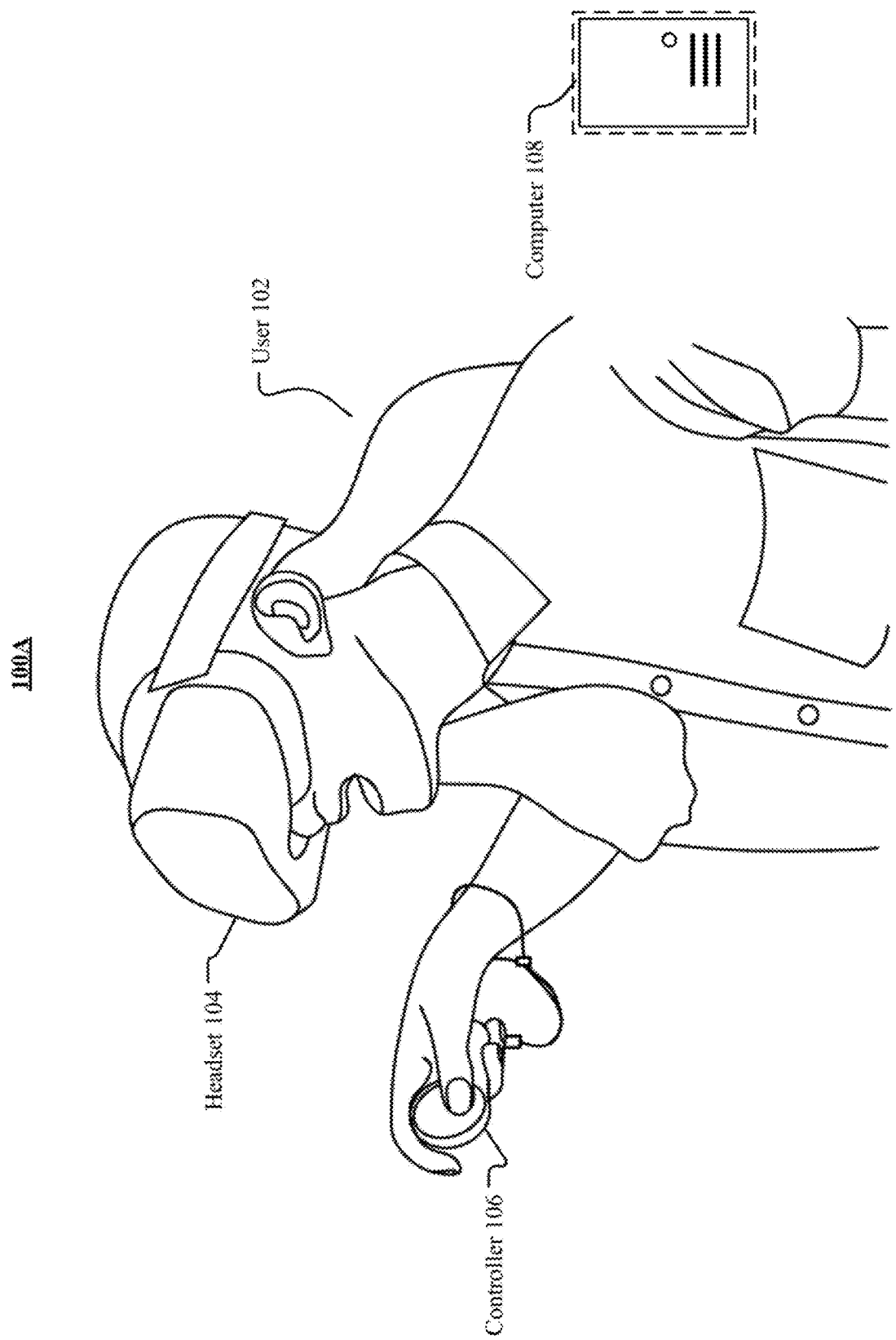
FIG. 1A illustrates an example artificial reality system.

AR/VR systems may be power, thermal, or compute constrained due to limited available battery power, heat dissipation due to small size and maximum safe temperature, or compute for example from the device's battery, CPU, or GPU. The configuration of the AR/VR systems is designed to meet the power and compute efficiency of head-mounted displays that satisfy growing computational requirements driven by better resolution, refresh rate, and dynamic ranges in order to elongate sustained usage time of untethered AR/VR devices and complete frames at sufficient speed to avoid user discomfort. It can be power and compute consuming to render every frame at a desired frame rate which has negative impact on the battery life and thermal limits of the AR/VR systems. For example, when the AR/VR systems display 60 fps, the AR/VR systems may render only 30 fps and extrapolate the in-between frames. Another display problem is low resolution and jittering of rendered image or layer frame in the display frame associated with the AR/VR systems. The reprojection step can introduce visual artifacts such as jittering or double vision when the head and/or eyes are moving. Although such visual artifacts may be suitable for computer graphics, natural imagery, or large text, it is very difficult for a user to read fine detailed text in the layer frame. It is critical to preserve high resolution visual quality based on the VR rendering pipeline so the layer frame can be very crisp and suitable for the user to read. Particular embodiments may use the compositor layers to improve image quality and avoid double aliasing. The compositor layers are simply textures that are rendered on top of the eye buffer with individual properties such as transforms and shapes. The compositor layers decouple the layer frame resolution from eye buffer resolution in order to avoid double sampling artifacts, such as double aliasing.

In particular, the AR/VR systems regenerate compositor layer transforms inside the compositor at display refresh rate by extrapolating. For example, when the AR/VR systems run at half rate mode so that half of the frames on the display are generated by warping the previous frame, such as ASW. The conventional method renders half of the display frames from the layer frame having a first pose in front of the image using the exact same pose which includes a translation and an orientation in 3D space, as the previous frame, which is incorrect. Particular embodiments may generate the display frames using an extrapolated pose based on the first pose of the layer frame and a second pose of a previously-submitted layer frame. As a result, the AR/VR systems can generate smooth extrapolated layer transformation poses (also scaling) based on the history transforms using an extrapolation algorithm, such as a linear lerping function. When two or more than two historic transforms are used to predict the next frame's layer transform, the AR/VR systems can account for 2nd order motion, such as acceleration or deceleration.

FIG. 1A illustrates an example artificial reality system 100A. In particular embodiments, the artificial reality system 100A may comprise a headset 104, a controller 106, and a computing system 108, etc. A user 102 may wear the headset 104 that could display visual artificial reality content to the user 102. The headset 104 may include an audio device that could provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
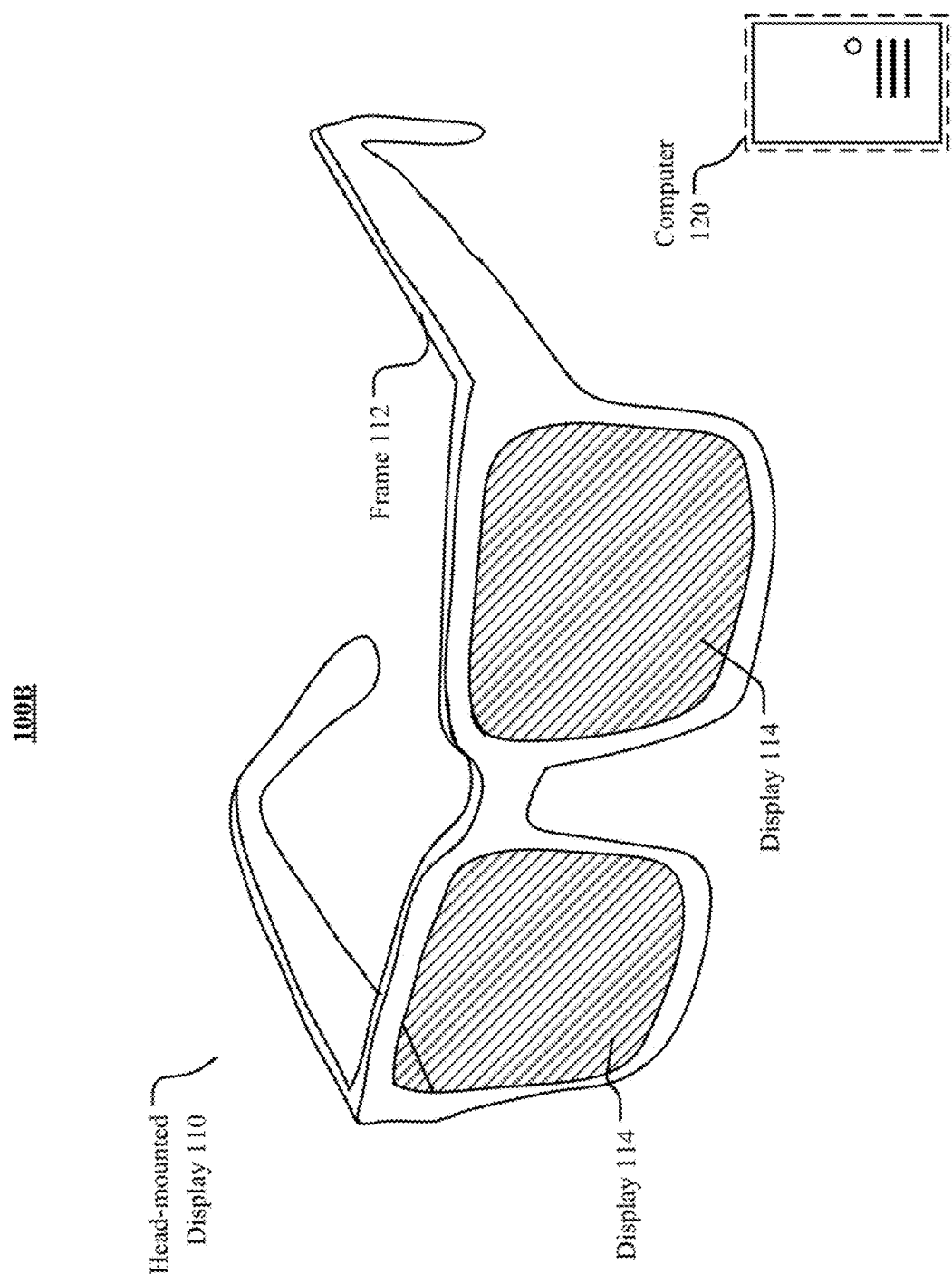
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2A:
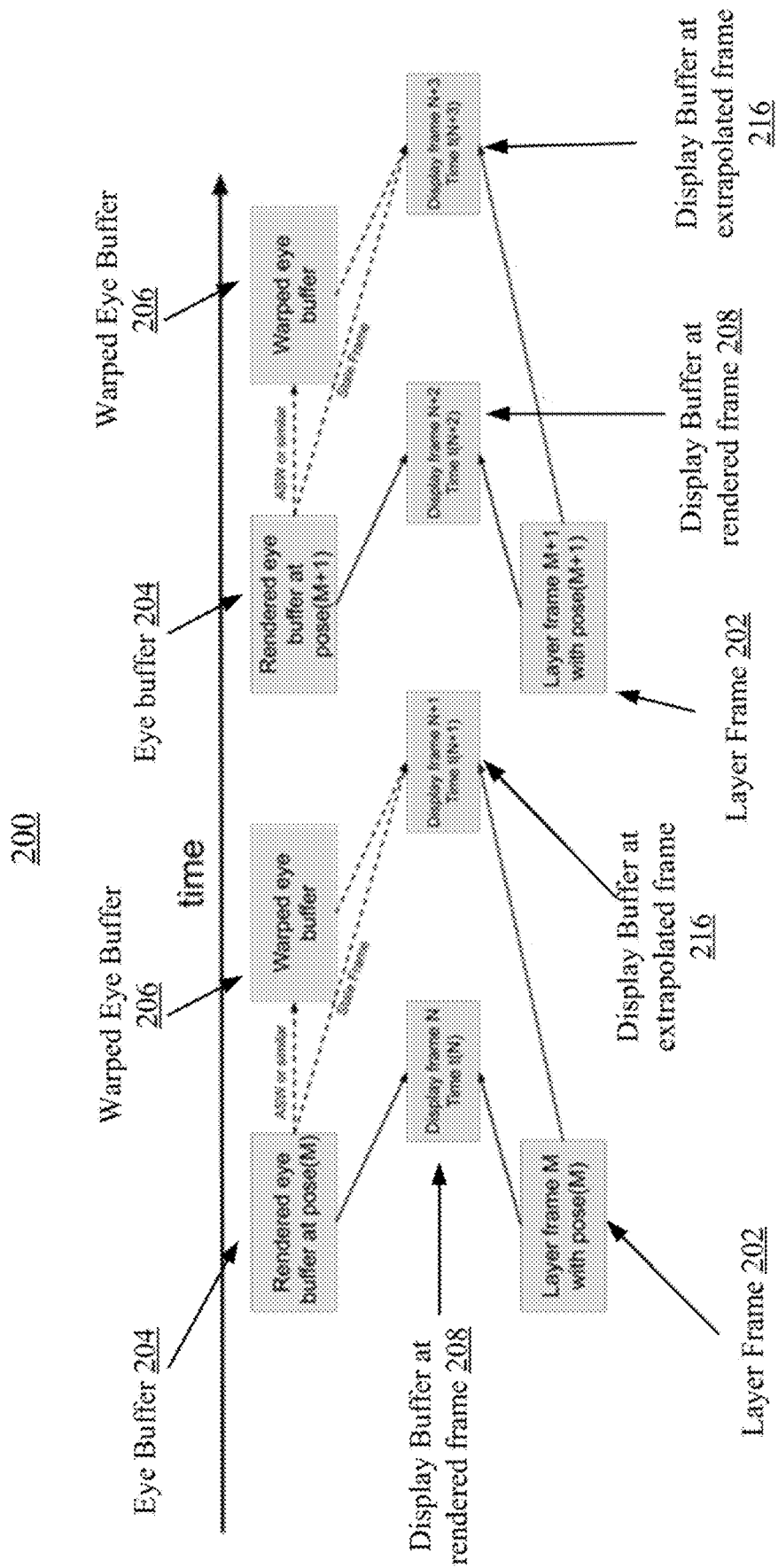
FIG. 2A illustrates an example compositor for compositor layer extrapolation of the AR/VR system for different time frames.

FIG. 2A illustrates an example compositor 200 for compositor layer extrapolation of the AR/VR system for different time frames. The compositor 200 can obtain an eye buffer 204 and a layer frame 202 having a first pose at time M or M+1 in front of the eye buffer. The eye buffer and layer frame can be distinct. The compositor 200 can generate a first display frame for a first viewpoint associated with a first time, such as a rendered time frame N or N+2, by separately rendering the image in the eye buffer 204 and the layer frame 202 having the first pose into a display buffer 208. The compositor can display the first display frame at the first time, such as a rendered time frame N or N+2. In particular, the compositor 200 can extrapolate an in-between time frame, such as an extrapolated time frame at N+1 or N+3. The compositor 200 can determine a warped eye buffer 206 by applying ASW and ATW to the image from an eye buffer 204 to account for head rotation or motion in the artificial scene. The compositor 200 can also adjust the warped eye buffer 206 to correct geometric distortion caused by the artificial reality lens. Likewise, the compositor 200 can apply ATW to the layer frame 202 to account for head rotation and warp the layer frame 202 to correct geometric distortion caused by the artificial reality lens. In particular embodiments, the compositor 200 can determine an extrapolated pose for the layer frame based on the first pose of the layer frame 202 and a second pose of a previously-submitted layer frame. The compositor 200 can generate a first display frame for a second viewpoint associated with the second time, such as the extrapolated time frame N+1 or N+3, by separately rendering the image in the warped eye buffer 206 and the layer frame 202 having the extrapolated pose into a display buffer 216. The compositor can send to the display pipeline the second display frame at the second time, such as the extrapolated time frame N+1 or N+3. Thus, the AR/VR systems can use a correct transformation to generate every display frame using the correct head pose for the exact time for the frame to avoid the 2D panel jittering.

Figure 2B:
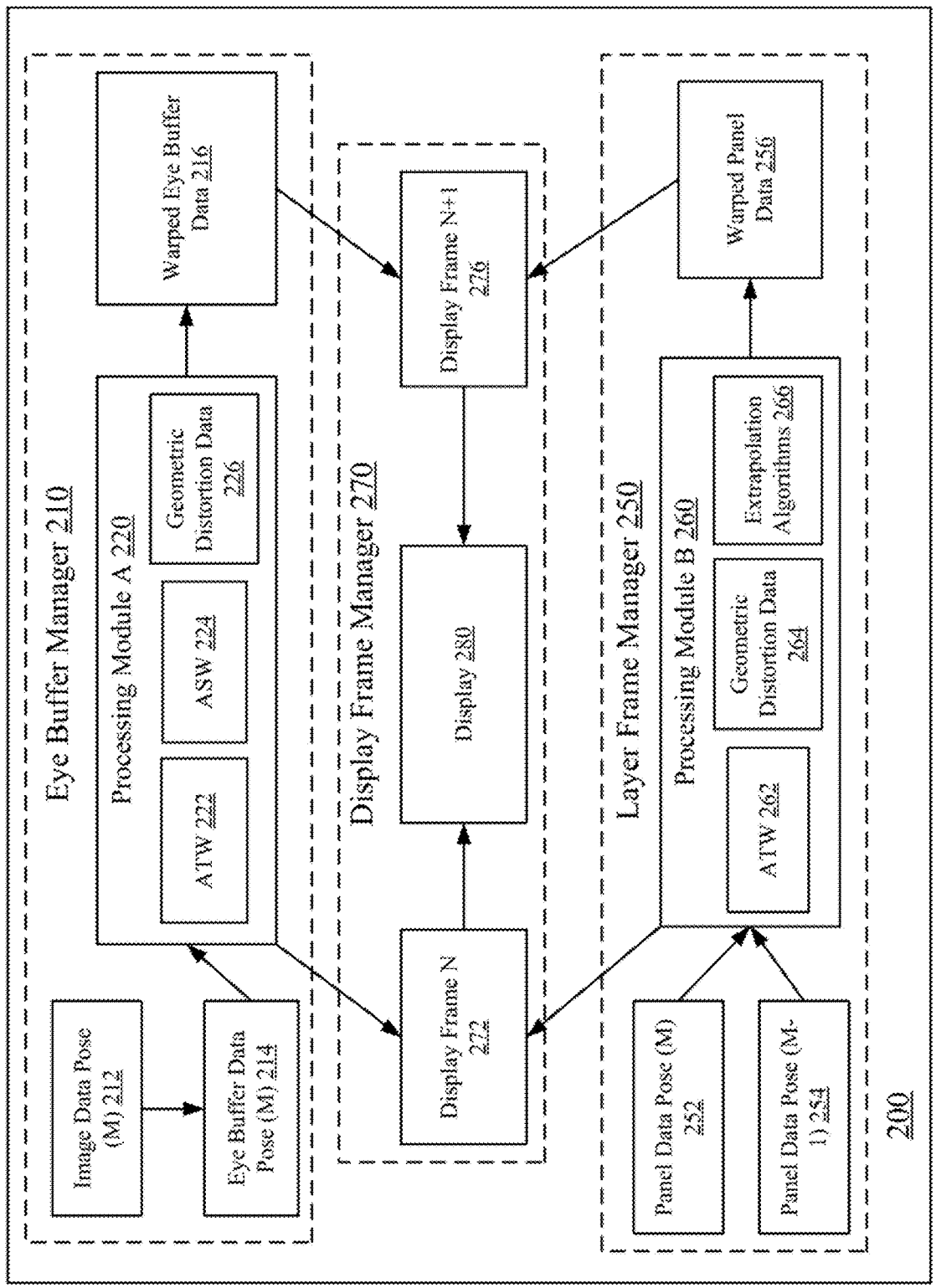
FIG. 2B illustrates an example compositor of the AR/VR system.

FIG. 2B illustrates an example compositor 200 of the AR/VR system. In particular embodiments, the compositor 200 may include an eye buffer manager 210, a layer frame manager 250, and a display frame manager 270. In particular embodiments, the eye buffer manager 210 can render an image data with pose M 212. For example, the image data have a pose at time M 212 can be a scene in a 2D image which is rendered at 30 fps. The eye buffer manager 210 can store the 2D image in an eye buffer data having the pose at time M 214 before submitting the received eye buffer data having the pose at time M 214 to the display frame manager 270 for display 280 at time frame N 272. By the time the eye buffer data having the pose at time M 214 is displayed at time frame N 272, it is possible that the head of the user can move a little. Therefore, the eye buffer manager 210 includes a processing module A 220 to adjust the eye buffer data having the pose at time M 214 using ATW 222 to account for head rotation and warp the eye buffer data having the pose at time M 214 using ATW 222 to correct geometric distortion using geometric distortion data 226 caused by the artificial reality lens. On the other hand, objects in the scene can move during the time frame N to the next time frame N+1. The processing module A 220 can apply ASW to move those objects in the scene of the image data with pose M 212 such as linearly according to a motion vector. As a result, the processing module A 220 determines a warped image stored in a warped eye buffer 216. Then at time N+1, the content in the warped eye buffer 216 is updated in a similar fashion to account for the user's viewpoint at that time. The eye buffer manager 210 can submit the received warped eye buffer 216 to the display frame manager 270 in a display pipeline for additional modification and for display 280 at time frame N+1.

In AR/VR systems, when the headset 104 position of the user 102 changes, the rendered image needs to be adjusted to account for the user's viewpoint at that time. For example, when the user 102 moves his/her head, the 2D image displayed on the display device of the headset 104 need to be updated accordingly to account for the latest headset pose. However, there is a time delay in rendering the 2D image on the display device of the headset 104. If the head of the user 102 is in motion, the AR/VR systems needs to determine new perspective views to the rendered images based on new head poses. A straightforward method is to render the eye buffer having the pose at time M 214 at every time frame as desired. However, it is time consuming and inefficient in terms of power, thermal, and compute. Instead, the 2D image stored in the eye buffer data having the pose at time M 214 may be transformed using three-warping to account tor the new perspective, such a new field of view (FoV) of the user 102.

Further, the eye buffer manager 210 applies several warping techniques to adjust the 2D image stored in the eye buffer data having the pose at time M 214 to correct for head motion of the user 102 that occurs after the scene is rendered and thereby reduce the perceived latency. In some embodiments, the eye buffer manager 210 can apply parametric time warp, non-parametric time warping, and ATW to account for rotation of the head of the user 102. In particular, the eye buffer manager 210 can apply a time warping to a rendered image before sending it to the display in order to correct for head motion that occurs after the scene is rendered and thereby reduce the perceived latency. For example, the time warping can be associated to orientation to correct for the rotational change in the head pose. The time warping can also be combined with warping process to correct for geometric distortion. For reasonably complex scenes, the combined time warping can provide considerable advantage of being a 2D warping to require much less computation resources. For example, parametric time warping can apply affine operations like translation, rotation and scaling of an image to reposition pixels of the image in a uniform manner. Accordingly, while the parametric time warping may be used to correctly update a scene for rotation of the head of the user 102. However, the parametric time warping can not account for translation of the head of the user 102 because some regions of the image may be affected differently than others.

Further, the eye buffer manager 210 can apply non-parametric time warping to account for non-parametric distortions of sections of the image, such as stretching. The non-parametric time warping may partly account for translation of the head of the user 102 due to a disocclusion which refers to an exposure of an object to view or a reappearance of an object previously hidden from view.

Further, the eye buffer manager 210 may apply ATW 222 to process the eye buffer data having the pose at time M 214 to account for point of view changes occurring due to head movement of the user, such as in AR/VR head mounted display/HMD settings, cursor movement, such as in video game handheld controller settings, and others. The ATW 222 is applied to separate scene rendering and time-warping into two separate, asynchronous operations. In particular, ATW 222 can be executed on multiple threads in parallel with rendering. Before every v-sync, the ATW 222 thread can generate a new time warped frame from the latest frame completed by the rendering thread. Likewise, ATW 222 may be executed on the GPU or on external hardware to increase the frame rate of the displayed image above a rendering rate. As a result, eye buffer manager 210 can apply ATW to generate intermediate frames to reduce judder when the AR/VR systems only render the images at half the desired frame rate, or below the display frame rate causing periodic occurrences where the rendered eye buffer is not complete upon its required time to be ready for the display v-sync, or associated with transmission of a frame from a remote engine.

Figure 4B:
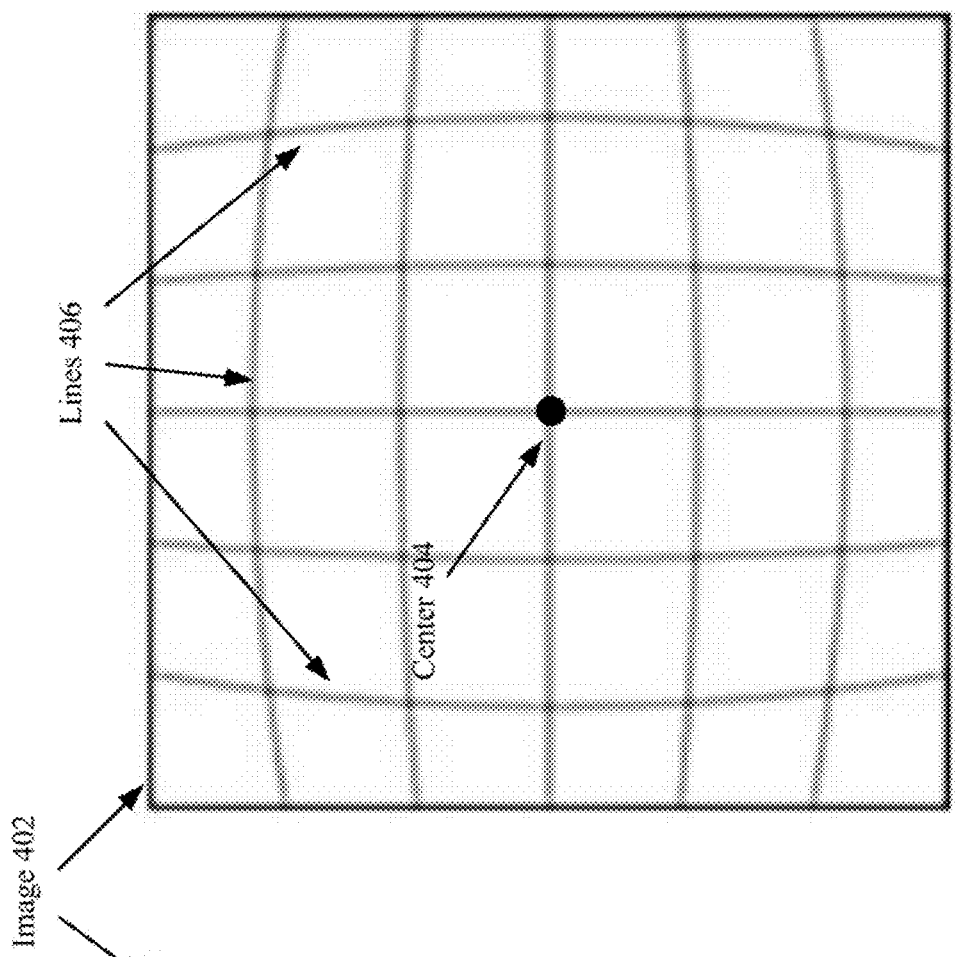
FIGS. 4A-4B illustrate example pin-cushion distortion and barrel distortion.
Figure 4A:
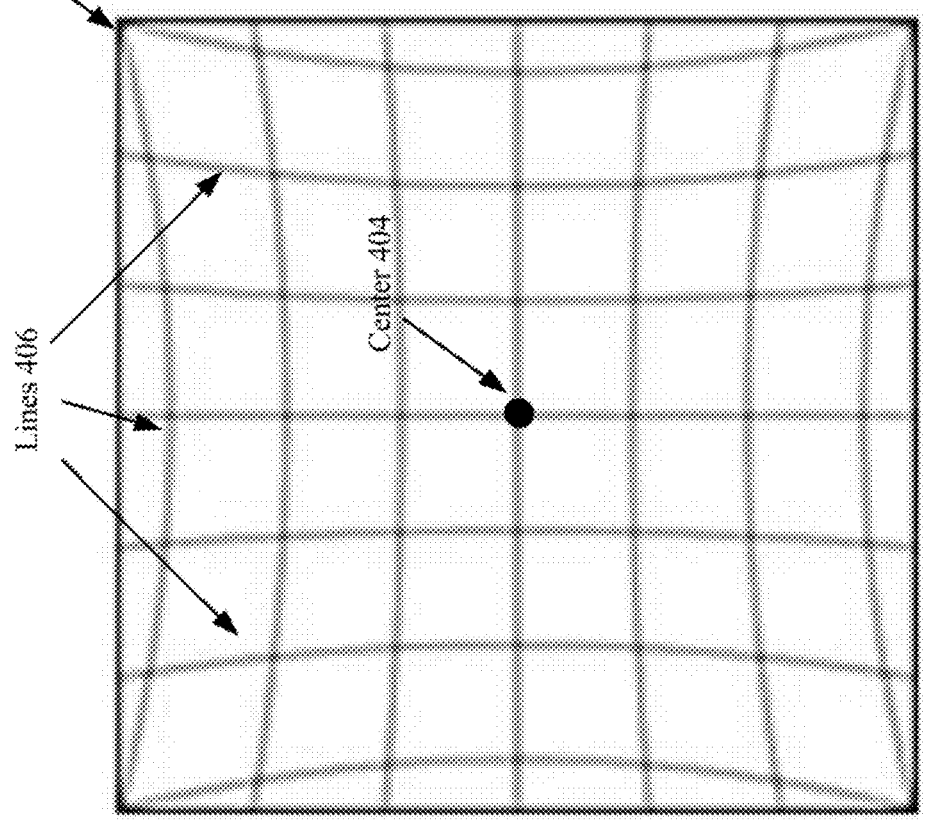
Figure 4C:
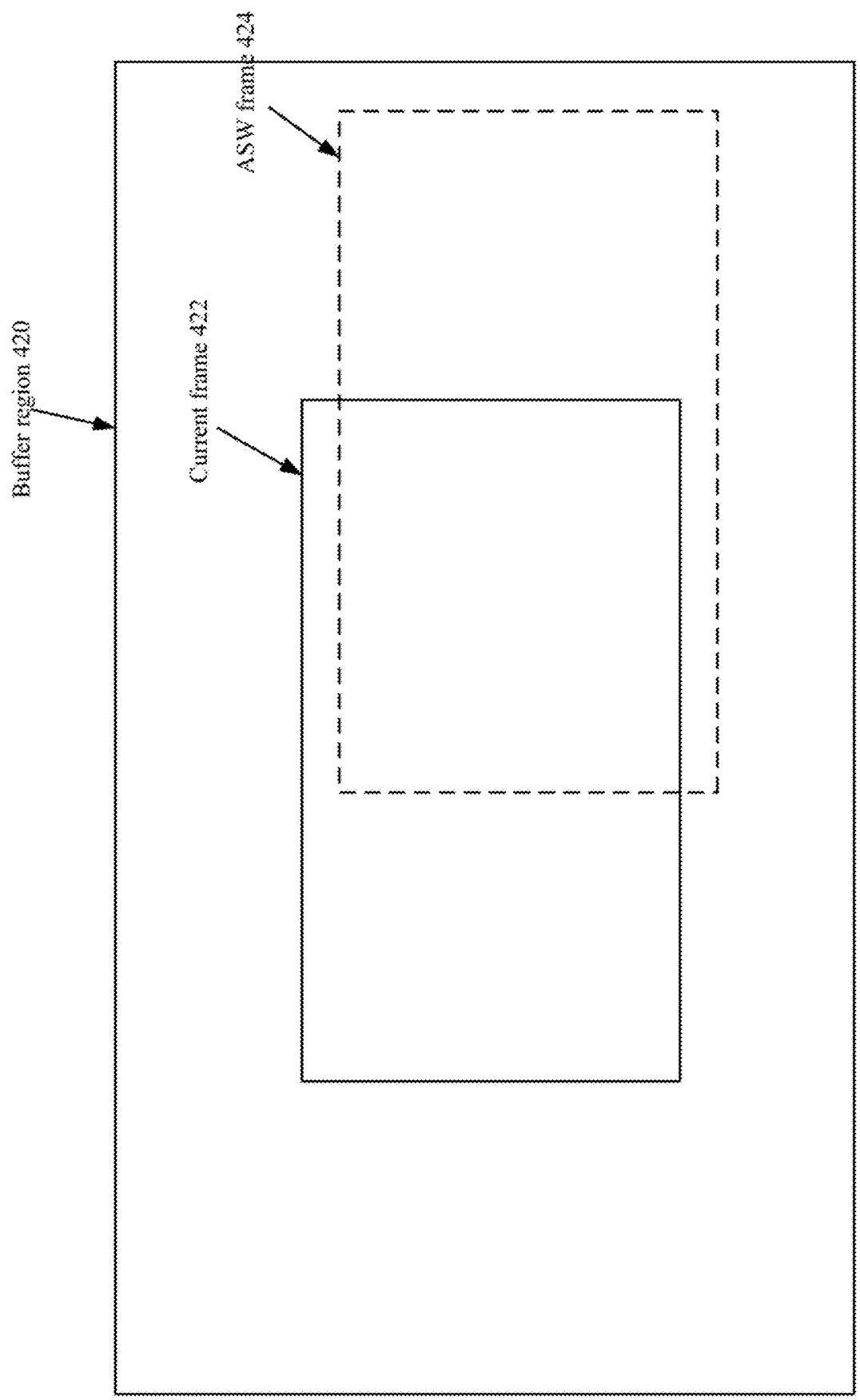
FIG. 4C illustrates an ASW example.

Turning to FIG. 4C, FIG. 4C illustrates an ASW example. The eye buffer manager 210 can apply ASW to a buffer region 420 which is rendered around a current frame 422. The buffer region 420 may be used to asynchronously shift rendered scenes to match the current head position of the user in the AR/VR systems. Thus, the current frame 420 may be encoded as a frame, whereas an ASW frame 424 may be rendered/generated from the buffer region 420 and the current frame 422 in response to head movement on the part of the user. In particular, the ASW frame 424 is determined from the current frame 420 for a further time frame on HMD display. The AR/VR systems can simply determine the ASW frame 424 using frame extrapolation and frame reprojection based on motion vector data and depth data. The motion vector data measures a moving velocity of each pixel in the current frame 420 by analyzing the current frame 420, estimating the motion velocity based on history frames, or submission by the application that generated the frame. The depth data measures the distance of each pixel from a rendering camera for depth-based reprojection to reduce HMD latency.

Turning back to FIG. 2B, the AR/VR systems may apply both ATW and ASW to allow time and space warping of a rendered frame to correct for the movement of head position and scene motion for a region of interest. Likewise, the AR/VR systems may apply both ATW and ASW to reduce the positional judder and other artifacts associated with the artificial reality lens or display. The region of interest may be determined based on eye tracking or content information. For example, a host device of a split-rendered system may generate a single depth plane for a region of interest of a scene to emphasize contribution from the region of interest. The value and parameters for the single depth plane may be determined based on eye-tracking information.

Further, the layer frame manager 250 receives a layer frame, such as a panel data having a first pose at time M 252 from the AR/VR system. The layer frame manager 250 applies a processing module B 260 to adjust the received layer frame using ATW 262 to account for head rotation and warp the received layer frame to correct geometric distortion caused by the artificial reality lens. The layer frame manager 250 can submit the received layer frame to the display frame manager 270. In particular, the layer frame manager 250 can submit the received layer frame separately from the image in the eye buffer 214. The compositor 200 can generate a first display frame 272 by separately rendering the image in the eye buffer and the layer frame into a display buffer for a first viewpoint associated with a first time. The first display frame can be a compositor layer which has better PPD for a user to read and no issue with occlusion. The display 280 can display the first display frame for the user to read both the image from the eye buffer and the fine detailed text in the layer frame. As a result, the compositor layer generated by compositor 200 solves several issues associated with a conventional method by submitting the layer frame to the eye buffer, such as low PPD of the layer frame and double aliasing. In particular, the compositor layer is characterized by a mathematical representation of a 2D surface in the scene, such as a quad surface, a partial cylinder surface, etc. Based on the received information, the compositor 200 can apply ray tracing to render the compositor layer at the physical display resolution limit before adding it onto the three-dimensional (3D) VR environment. This results in much higher image quality on the 2D surface when viewed in VR than rendering the full 3D environment containing the 2D surface by generating an eye buffer because the latter is further re-sampled (double aliasing) by ATW before presenting on the display.

Further, the AR/VR systems can update the transformation of a compositor layer from a compositor layer space to an application reference space in existing XR implementations. The compositor layer space and the application reference space can be characterized by a Cartesian coordinate system with origin point and three axes (x/y/z). The transformation of a compositor layer from the compositor layer space to the application reference space is determined by applying a 4×4 matrix which can transform a homogeneous four-dimensional (4D) vector from one space to another. For example, a pose of the compositor layer space in the application reference space corresponds to a transformation from the application reference space to the compositor layer space. This transformation controls where the 2D surface appears in the virtual 3D scene. However, because of power, thermal, or compute constraints, the AR/VR systems at times can not complete rendering a frame fast enough or transmission of a frame from a remote engine is delayed, so a previous frame (called a stale frame) is again modified by the compositor and for later presentation on the display.

Alternatively the AR/VR systems may notice the delayed rendering or transmission and enable reduction to half of the desired display rate mode with ASW.

In these instances, the compositor layer can appear jittering when moving if the compositor layer is not corrected to use the correct head pose for the exact displaying time frame. For example, if a user translates his/her head while keeping his/her eyes on a point of the virtual panel, the movement of the user appears to jump back and forth in the virtual space. Due to the high frame rate this may appear as two ghost images (double vision) while the panel shifts in virtual space at half the display rate. The effect is discomforting and greatly increases the difficulty of interacting with a virtual panel such as when reading text or clicking on a User Interface (UI) button. It is critical that the correct transformation is used to generate every display frame using the correct head pose for the exact displaying time frame to avoid the 2D panel jittering. The compositor 200 can deliver a frame from a layer frame to display every refresh cycle at a refresh rate, such as 90 fps, regardless of the frame rate of the application rendering. The compositor 200 can deliver a frame from a layer frame by monotonic increasing display frame counter N. Likewise, the compositor 200 can submit layer update information in a layer frame at application rendering frame rate of 30 fps and monotonic increase layer frame counter M.

Further, the layer frame manager 250 receives an additional layer frame, such as a panel data having a second pose at time M−1 254, from the AR/VR system. The processing module B 260 can extrapolate the pose of the layer frame for time N+1 based on the first pose of the layer frame and the second pose of a previously-submitted layer frame. There are various extrapolation algorithms to apply the extrapolation for the pose of the layer frame for time N+1. For example, the processing module B 260 can apply an extrapolation algorithm 266 to extrapolate the pose of the layer frame for time N+1 based on equation 1. As another example, the processing module B 260 can account for an acceleration component for a linear/constant velocity based on three or more previously submitted poses of the layer frame. As a result, the processing module B 260 can determine an updated pose for the layer frame. The content of the layer frame can be the same as what was submitted at time N or updated with newer content in which the message may change from time N to N+1. In particular, the processing module B 260 can apply ATW 262 to account for head rotation and warp the panel to correct geometric distortion using geometric distortion data 264 separately from the image in the warped eye buffer 216. For example, if there are one warped eye buffer data 216 and five panes, the AR/VR system can apply a different warping operation for each of the warped eye buffer data 216 and five panes. The processing module B 260 can warp the layer frame using ATW 262 and warp the layer frame to correct geometric distortion using geometric distortion data 264 to determine warped panel data 256 to submit to the display frame manager 270. The compositor 200 can generate a second display frame 276 by separately rendering the image and the layer frame having the extrapolated pose into the display buffer for a second viewpoint associated with a second time, such as time frame N+1.

$$P^{new}(t) = P_{lerp}(P(t2), P(t1), \frac{t - t2}{t1 - t2}) \quad (1)$$

where t is the current display frame display time, P(t2) and P(t1) are the latest 2 available history poses submitted by the AR/VR system, t1 and t2 are the corresponding predicted display time, $P_{lerp}(\ )$ is a function to do smooth lerping between 2 poses by applying smooth lerping on orientation and linear lerping on position.

Figure 3:
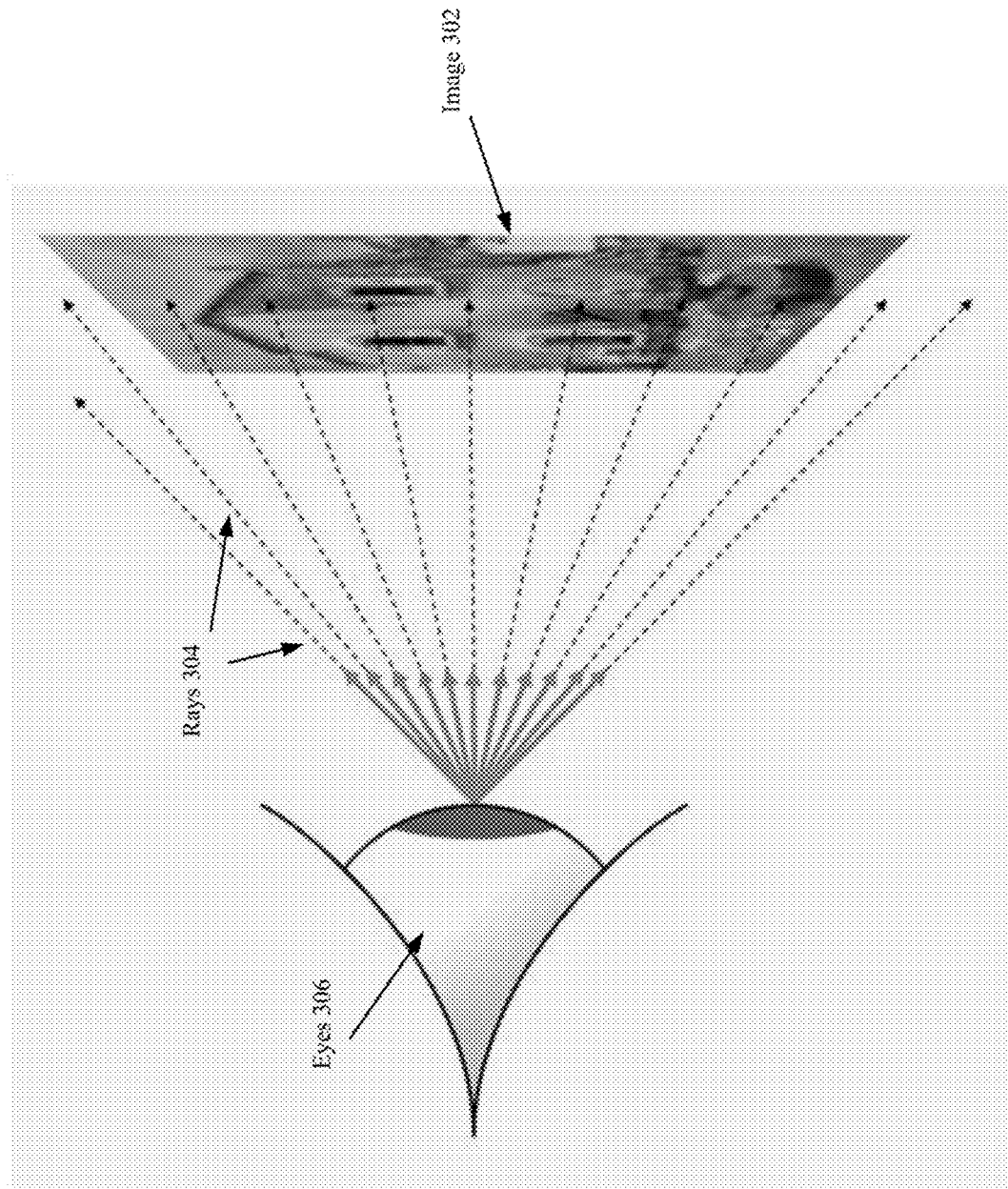
FIG. 3 illustrates an example eye buffer to display buffer by ray-tracing of the AR/VR system.

FIG. 3 illustrates an example eye buffer to display buffer by ray-tracing of the AR/VR system. In particular embodiments, the display 280 can obtain the eye buffer data having a pose at time M 214 and warp it to a front-buffer, such as a display buffer, for scan-out and display. While the display resolution is set by the hardware, there is a degree of freedom in picking the eye buffer resolution. To present the eye buffer, the display 280 can correct for the distortion caused by the optics by applying a pre-calculated mesh distortion in the vertex shader, such as a barrel distortion. As a result, the display 280 projects the image 302 in the eye buffer data having the pose at time M 214 at a predetermined distance away, such as one meter, from the eyes of the user 306. Likewise, the display 280 shoots rays 304 through the display buffer pixels to determine the output color. The AR/VR systems apply the ray tracing technique to compute visibility between points. For example, two points in a Euclidean space can be visible to each other, if the line segment that joins the two points does not intersect any obstacles. The ray-tracing technique is an image centric algorithm for solving the visibility problem in a two steps process which are associated with visibility and shading: one step iterates over all the pixels in the image and the other step iterates over the objects in the scene.

FIGS. 4A-4B illustrate example pin-cushion distortion and barrel distortion. The optics introduces a geometric distortion when the display 280 projects an image 302 at a predetermined distance away from the eyes of the user 306. A mesh distortion is measured by the deviation from rectilinear projection in which straight lines in a scene remain straight in an image. FIG. 4A shows an example of pin-cushion distortion caused by a convex spherical lens. The mesh distortion, such as image magnification, increases with the distance from the optical axis which is perpendicular to the mesh. For example, the lines 406 that do not go through the center 404 of the image 402 are bowed inwards, towards the center 404 of the image. FIG. 4B shows an example of barrel distortion which can be used to counteract the mesh distortion effect of a pin-cushion distortion. A barrel distortion can be associated with a concave spherical lenses. The mesh distortion, such as negative image magnification, increases with the distance from the optical axis which is perpendicular to the mesh. For example, the lines 406 that do not go through the center 404 of the image 402 are bowed outwards, away from the center 404 of the image. Both barrel and pincushion distortions can be caused by an aperture of the artificial reality lens. However, the pin-cushion distortion has a positive distortion effect where the image of the square is less magnified at the center than the edges. The barrel distortion has a negative distortion effect where the image of the square is greater magnified at the center than the edges. The AR/VR systems can use both pin-cushion distortion and barrel distortion together to fix distortion associated with the artificial reality lens.

Figure 5:
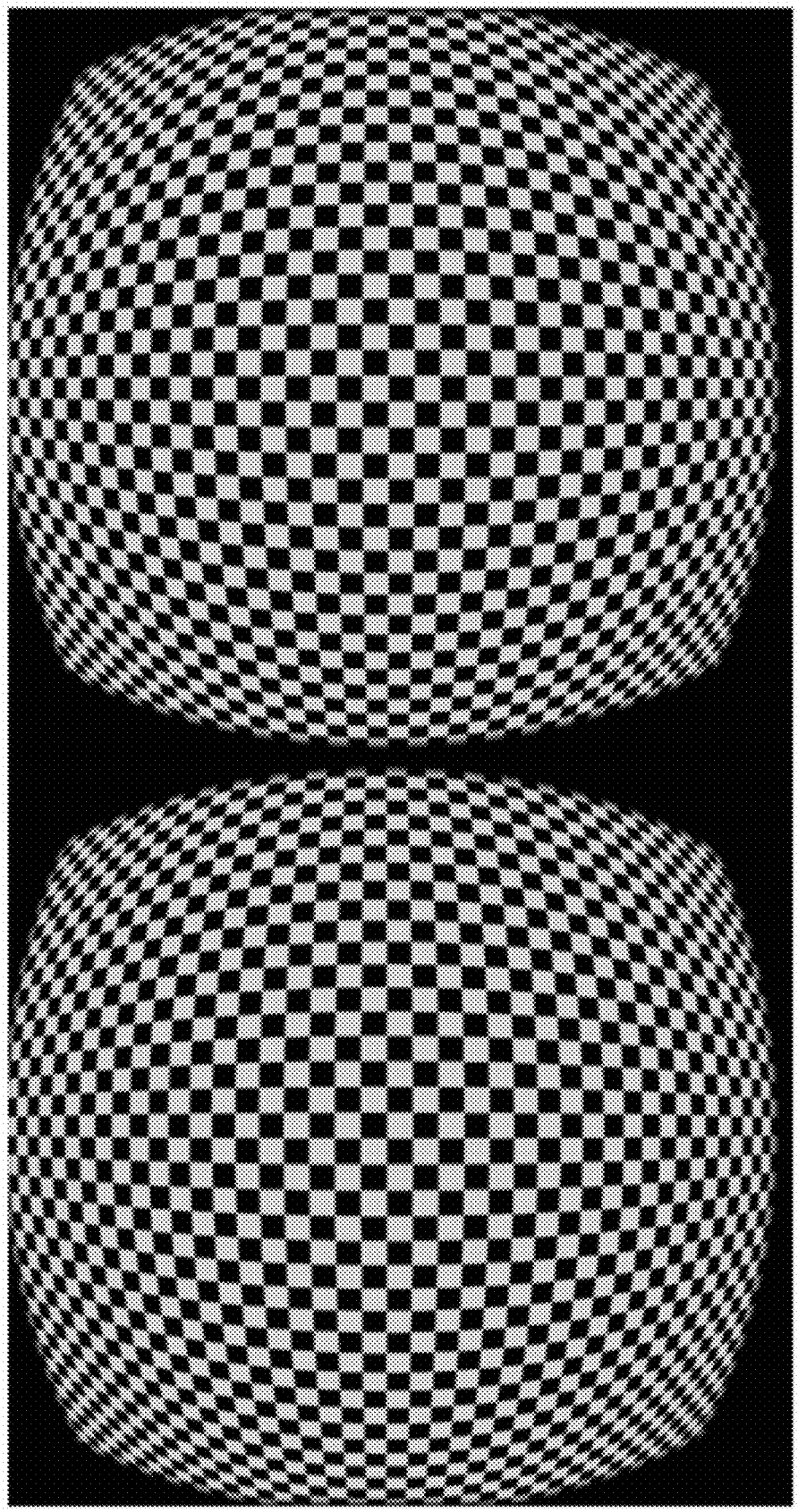
FIG. 5 illustrates an example black and green 64×64 pixel checkerboard eye buffer in post-distorted space.

FIG. 5 illustrates an example black and green 64×64 pixel checkerboard eye buffer in a post-distorted space. An VR rasterizer is designed to convert an image described in a vector graphics format into a raster image which comprises a series of pixels, dots, or lines, when displayed together, create the image represented via shapes. In particular, an optimal VR rasterizer can rasterize curves that can become straight lines in the post-distorted space. In FIG. 5, central pixels are magnified due to the barrel distortion applied to counteract the pin-cushion distortion caused by the artificial reality lens. The barrel distortion is applied because of the limitation of using rectilinear rasterizers in a pre-distorted space. In order to achieve approximately a 1:1 pixel ratio in the central region, an ideal eye buffer resolution should be higher than the display buffer resolution. However, the recommended eye buffer resolution for a typical VR device, such as Oculus Quest, is actually lower than the display buffer resolution due to the mobile GPU hardware constraints, rendering in such high resolution would be too much to complete within frame timing budget. For example, Quest 2 display buffer resolution is 1832×1920, and the ideal eye buffer resolution is 2560×2736 (~×2 pixels). However, the recommended resolution is 1440×1584 (~×0.65 pixels). Thus, for Quest 2, the VR system obtains poor PPD in the post-distorted space. As a result, the poor PPD in the post-distorted space is acceptable for smooth natural-looking images, but the poor PPD in the post-distorted space is unacceptable for fine font size which should maintain crispness for the user to read.

Figure 6A:
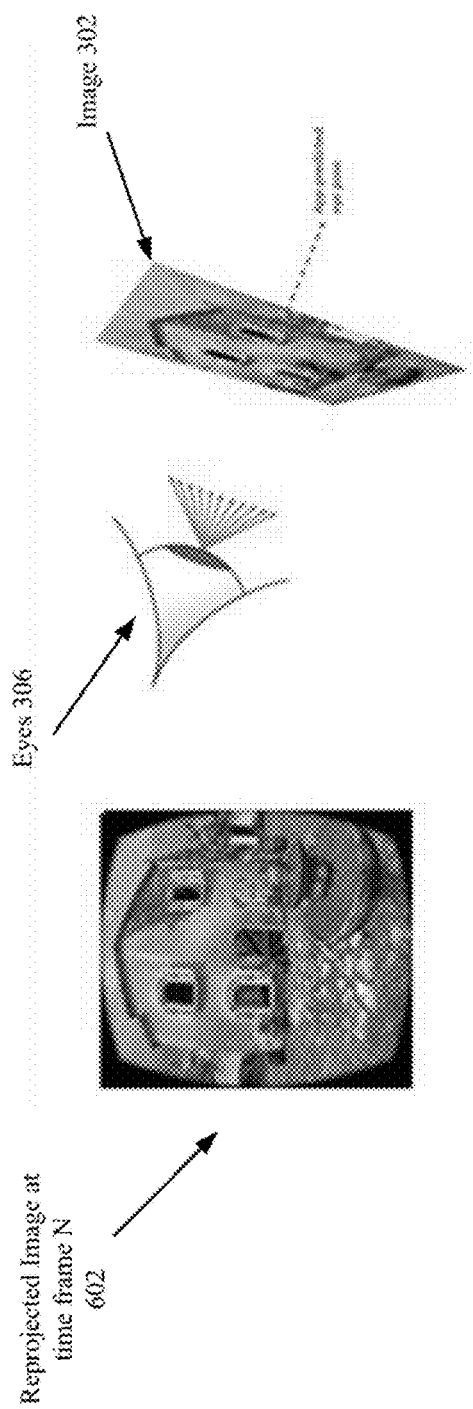
FIGS. 6A-6B illustrate example time-warp reprojection corrections.
Figure 6B:
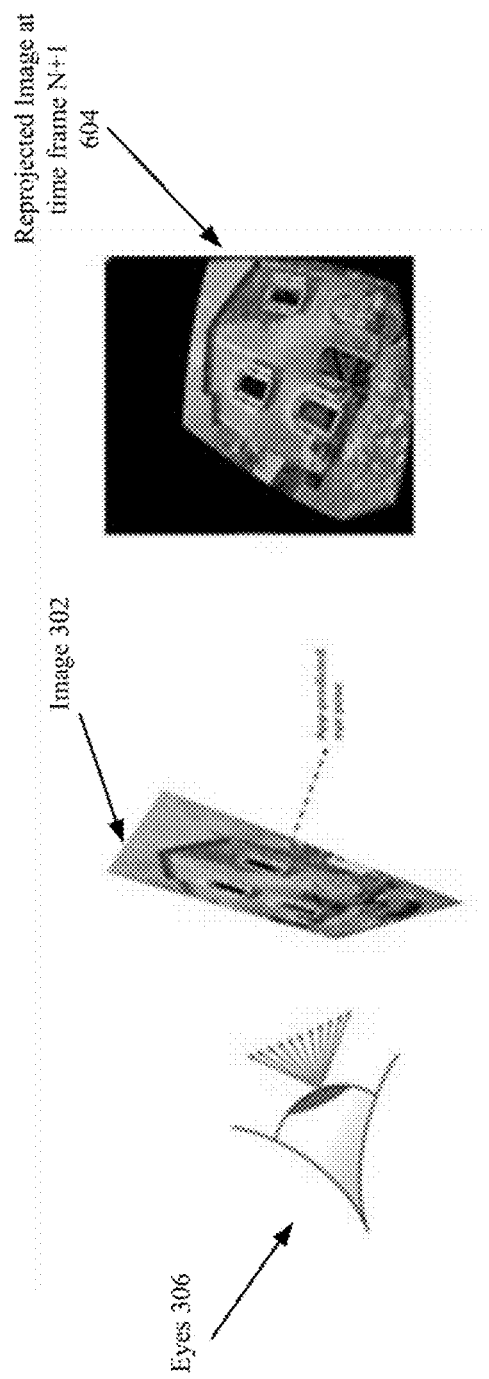

FIGS. 6A-6B illustrate example time-warp reprojection corrections. The display 280 can apply time warping reprojection before writing an image and/or a panel to the display buffer. When the AR/VR systems render a frame, a pose of the user, such as a translation and an orientation of the user's head, is predicted and rendered to it. FIG. 6A shows an example of time-warping reprojection correction at time frame N. For example, the eyes 306 of the user look down at the image 302 at a right angle. Thus, the reprojected image at time frame N 602 is centered. FIG. 6B shows an example of time warping reprojection correction at time frame N+1. It is clear the eyes 306 of the user move to a different pose by looking up at the image 302. It is important that the AR/VR systems can apply time warping to the image 306 in the eye buffer to correct the predicted pose for lens distortion and head-pose prediction error based on current sensor readings before submitting the frame for display. As a result, the reprojected image at time frame N+1 604 is very different from the previous reprojected image at time frame N 602 because of different poses of eyes 306 of the user.

However, the reprojection step generates additional artifacts in the form of additional blurring. The generated additional artifacts deteriorate the resolution of the image and/or the pane. Usually, the degrading quality of the image is acceptable for the user to read. However, the degrading quality of the panel makes it difficult for the user to read the fine detailed text. This unwanted phenomenon is caused by double aliasing because the detailed text of the panel is aliased twice: the text content is aliased for the first time when the text content is resampled into an eye buffer from a texture atlas, and the text content is aliased for the second time when to reproject the image in the eye buffer. Therefore, it is desired to increase resolution under hardware constraints and avoid double aliasing issues that can degrade visual quality.

Figure 7:
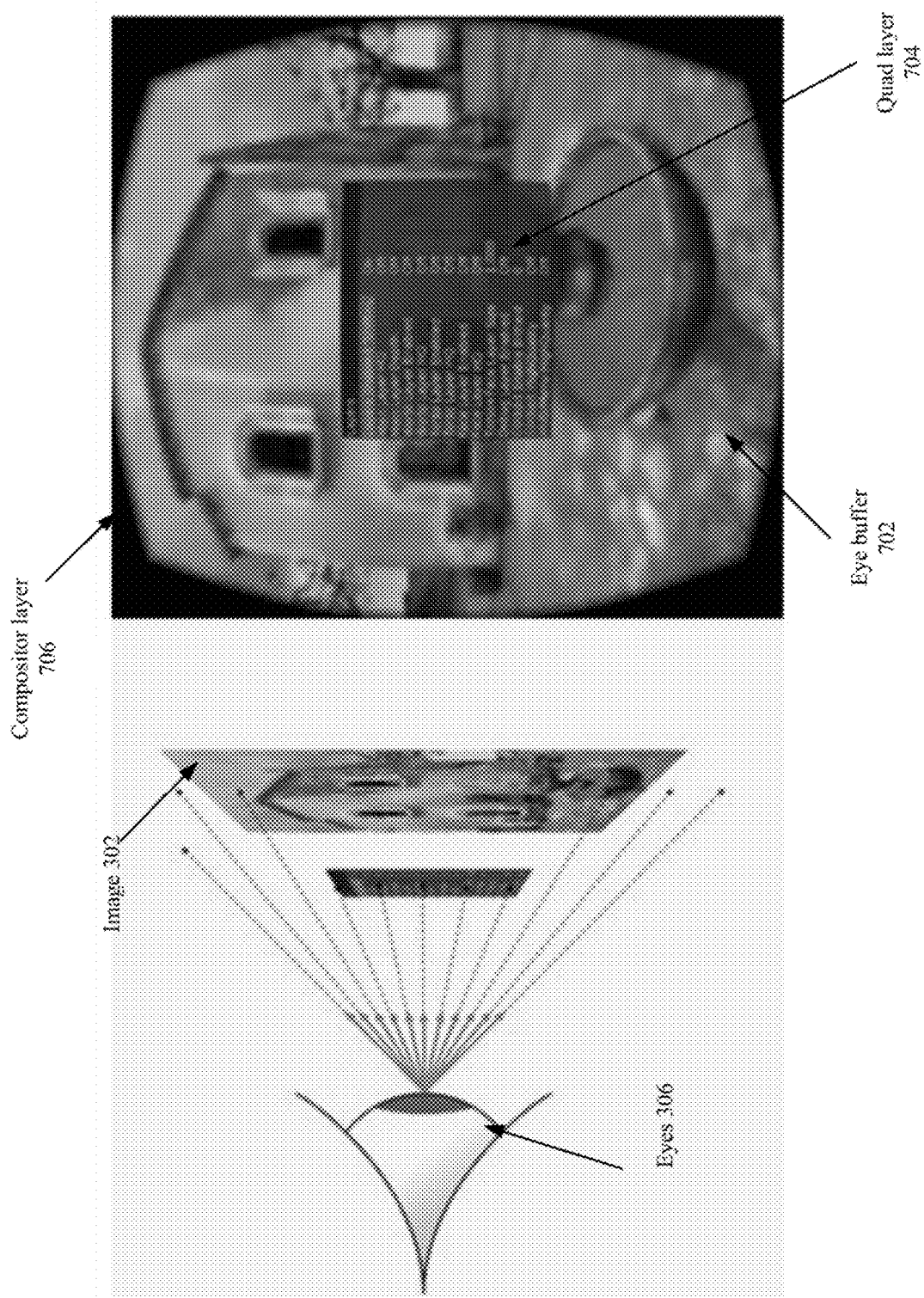
FIG. 7 illustrates an example VR compositor layer with a low resolution eye buffer and a quad layer.

FIG. 7 illustrates an example VR compositor layer with a low resolution eye buffer and a quad layer. The VR system can use a compositor layer to avoid the double aliasing issue. The compositor layer comprises textures that are rendered on top of the eye buffer with individual properties such as transforms and shapes. FIG. 7 shows a compositor layer 706 with a low resolution eye buffer 702 and a quad layer 704. The text in the quad layer 704 is sharp and crisp while the low-resolution eye buffer 702 is blurry. However, the low resolution is still acceptable for the user. The contrast in resolution of the text in the quad layer 704 and the image in the eye buffer 702 is caused when the AR/VR systems reproject them separately and render a compositor layer, such as the text in the quad layer 704, after the other, such as the image in the eye buffer 702, into the display buffer in a multi-pass fashion. Even though the quad layer 704 needs separate reprojections with additional rendering costs during composition, the quad layer 704 is effective to avoid double aliasing issues by decoupling the quad layer's resolution from the eye buffer resolution. As a result, the compositor layer provides a better resolution compared to the conventional method. The conventional method composes the layer into the eye buffer first and then time warping reprojects the eye buffer containing the layer again. Therefore, both the image in the eye buffer and the text in the quad layer suffer low resolution due to double aliasing issues.

In addition, the compositor layer 706 decouples the rendering rate of the quad layer 704 from the display refresh rate of the eye buffer 702, which is important for static text content or streaming application. For example, if the quad layer 704 renders a UI menu that does not change frequently, the AR/VR systems do not need to re-submit the layer every frame—the compositor 200 can reposition the layer properly on each frame.

Figures 8A, 8B:
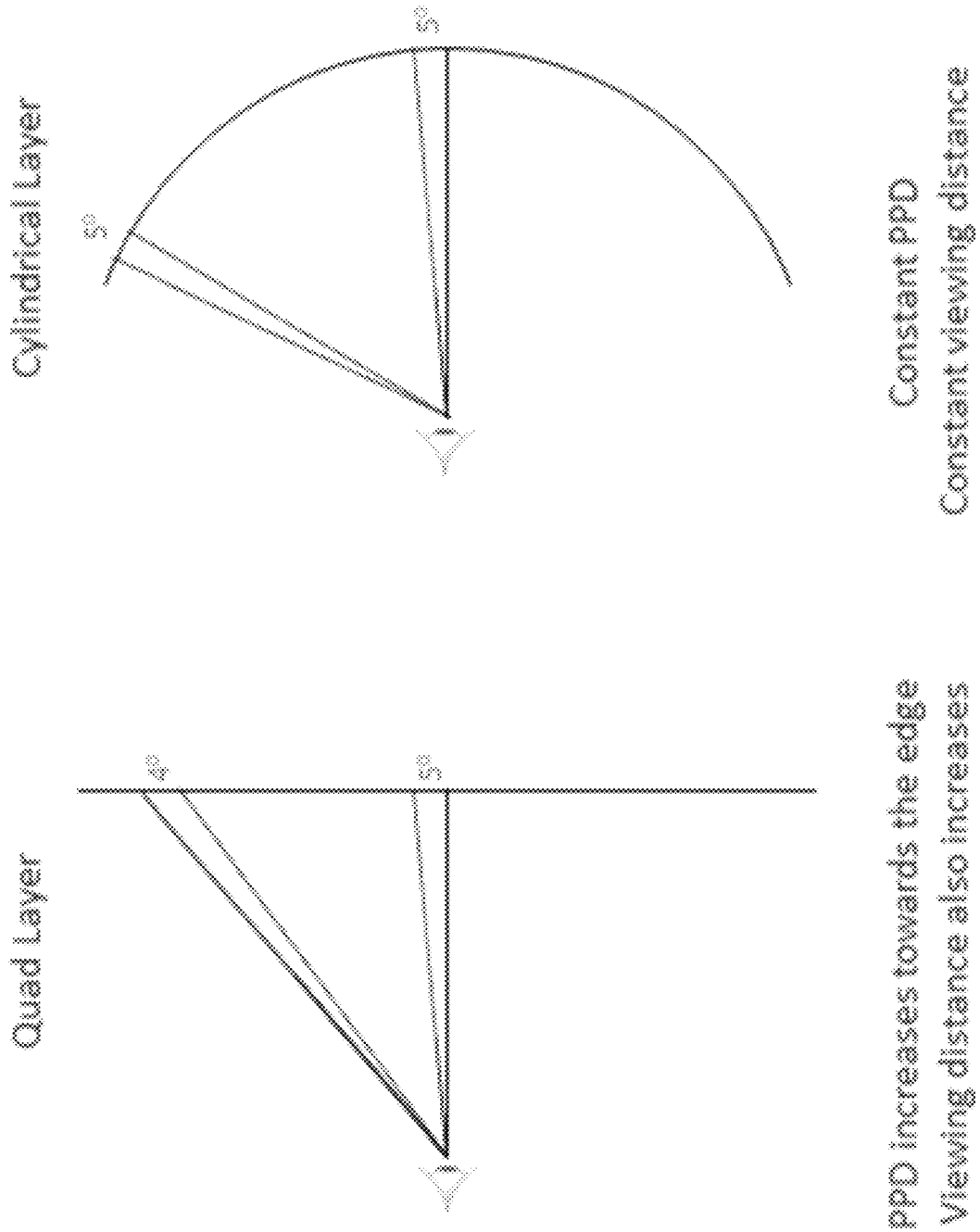
FIGS. 8A-8B illustrate example quad layer and cylindrical layer.

FIGS. 8A-8B illustrate example quad layer and cylindrical layer. The PPD of the AR/VR systems is characterized by field of view (FOV) and per-eye resolution. Under nominal viewing conditions when the eyes 306 of the user look straight ahead at the center of the image 302, the AR/VR systems concentrate maximum PPD at the center of the image. As a result, the AR/VR systems can view big screens in a generic layer shape that are perpendicular to the viewing direction. For example, AR/VR systems have a 64×64 per-eye resolution covering a 10×10 degree section of the focus area for a pixel density of 6 PPD. However, the PPD of the AR/VR systems is also closely associated with the layer shape, such as quad or cylindrical. FIG. 8A shows a quad layer. The lens distortion associated with the AR/VR systems causes physical PPD to be roughly constant at the center and decrease towards the periphery. Even though the quad's virtual PPD increases but the display's physical PPD decreases. Therefore, in VR the quad layer loses information towards the edges due to under-sampling from PPD mismatch because there are not enough physical pixels to represent the virtual pixels.

FIG. 8B shows a cylindrical layer. A cylindrical shaped surface has the trait of maintaining constant PPD on the horizontal axis, hence the cylindrical layer is doing better than the quad layer towards the edges of the layer. When the eyes of the user are positioned exactly at the center of the cylinder, the cylindrical layer also has an equal distance for any given point on the horizontal axis, making fine features such as text appear to be equally sized in the reading direction.

When considering looking straight ahead at a cylindrical layer in post-distorted space, it focuses more resolution towards the center of the lenses. As a result, the AR/VR systems obtain peak and roughly constant physical PPD near the center of the lenses. Even though there's a physical and virtual PPD discrepancy towards the edge of the layer, it's further mitigated by the layer's curvature.

Figure 9:
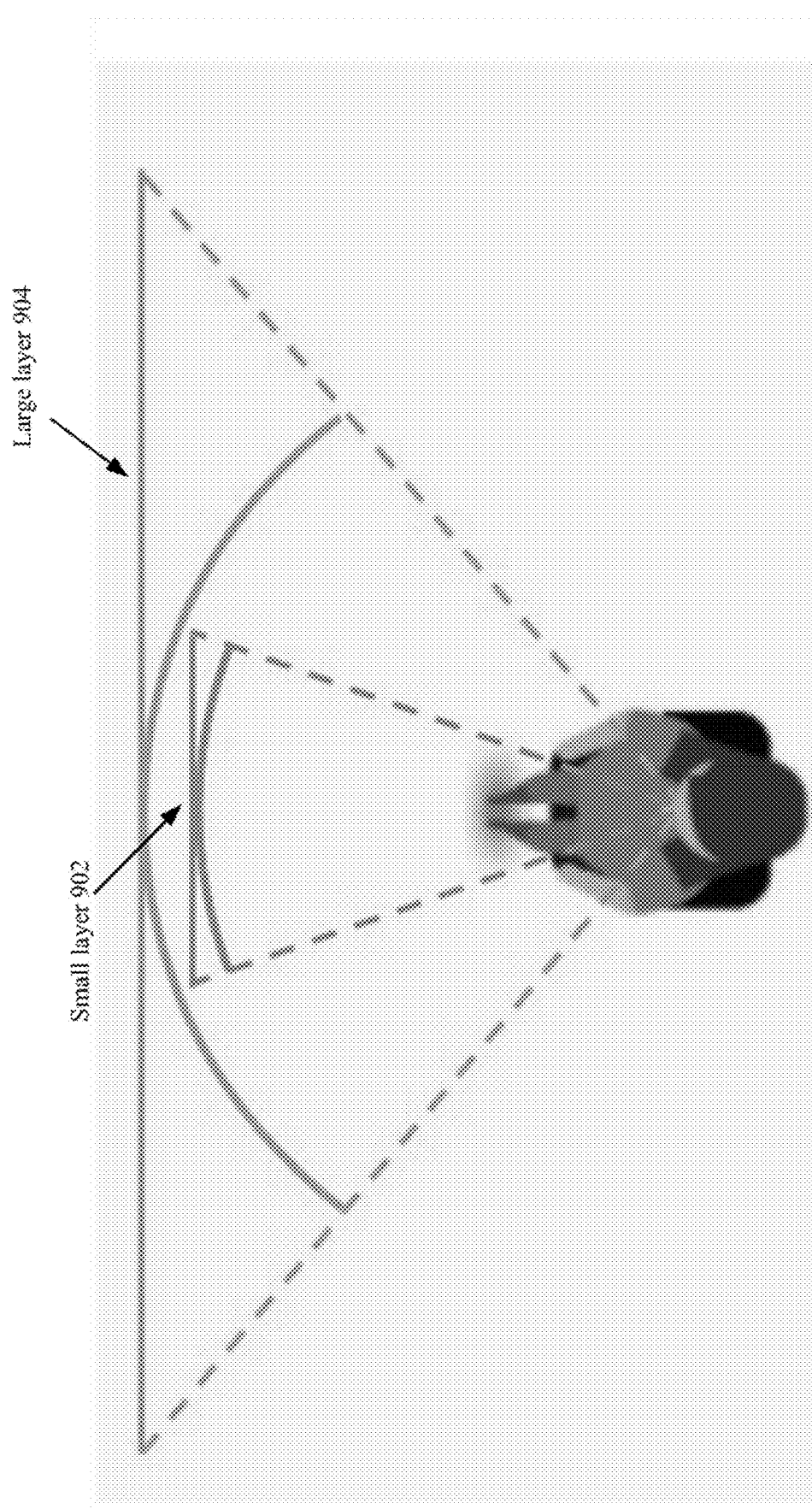
FIG. 9 illustrates an example comparison between a quad layer and a cylindrical layer.

FIG. 9 illustrates an example comparison between a quad layer and a cylindrical layer. In particular, the peripheral PPD mismatch between a quad layer and a cylindrical layer reduces as the layer becomes smaller. For small surfaces for a small layer 902, the mismatch is minimal so either a quad layer or a cylindrical layer can be used. Note that the nice PPD properties of the cylinder are only valid in the horizontal direction which is important for text reading. The vertical axis behaves like a quad and therefore it is good to keep it short. However, for large surfaces for a large layer 904, the mismatch is very large so a quad layer or a cylindrical layer can be used depending on the PPD requirement and layer configuration.

When presenting a layer (with a given shape) in VR, there is the flexibility of configuring many virtual parameters: the size of the virtual screen, the viewing distance, and the resolution. As a result, the configuration of the AR/VR systems boils down to PPD. It is easy to use PPD and scaling factor to control the layer's resolution and its size. To maintain the perceived size in VR the scaling factor has to compensate for the increased resolution. For example, when increasing panel pixel density from 16 to 20, it needs a scale factor of 20/16=1.25 to preserve the same perceived size (virtual PPD). This is actually the parameter configuration changes between Quest 1 and Quest 2 and the reason why the virtual PPD has increased in the Home Shell environment. Note that increasing the panel pixel density increases the app rendering costs.

As another example, a perceptual text legibility improvement by increasing it to 22 and 24 with scaling factors of 1.375 and 1.5, respectively, can increase text legibility by further increasing PPD for Quest 2 using the VR browser as a test-case. Beyond that point, for Quest 2 HMD, there's no significant benefit of further increasing PPD because there are diminishing returns since physical PPD is lower than the virtual PPD.

In VR, it is possible to push the layer further away and scale it much bigger to compensate for the perspective foreshortening so panel FoV and virtual PPD remain constant. However, it needs to be chosen between a small layer 902 or a large layer 904. Small layers 902 are close to the viewer, such as for virtual phone. Large layers 904 are far away from the viewer, such as for a virtual billboard. The viewing distance is inversely proportional to translational errors. That is, pushing surfaces further away helps to reduce jittering and improve comfort. On the other hand, the HMD focal distance configuration is designed for 1.3 meters, and Home Shell environment's panels are 2 meters away from the user. In the ideal scenario, the VR system can apply the focal distance to match exactly the viewing distance to reduce any possible discomfort caused by vergence-accommodation conflict (VAC). As a result, the VR system keeps the viewing distance close to 1.3 meters. The diopter error is rather small ~0.27 D and its impact on comfort is unclear. Adjusting the focal distance would be possible in the future using varifocal systems and further research is required in this area to better understand the diopter mismatch tradeoffs.

Figure 10:
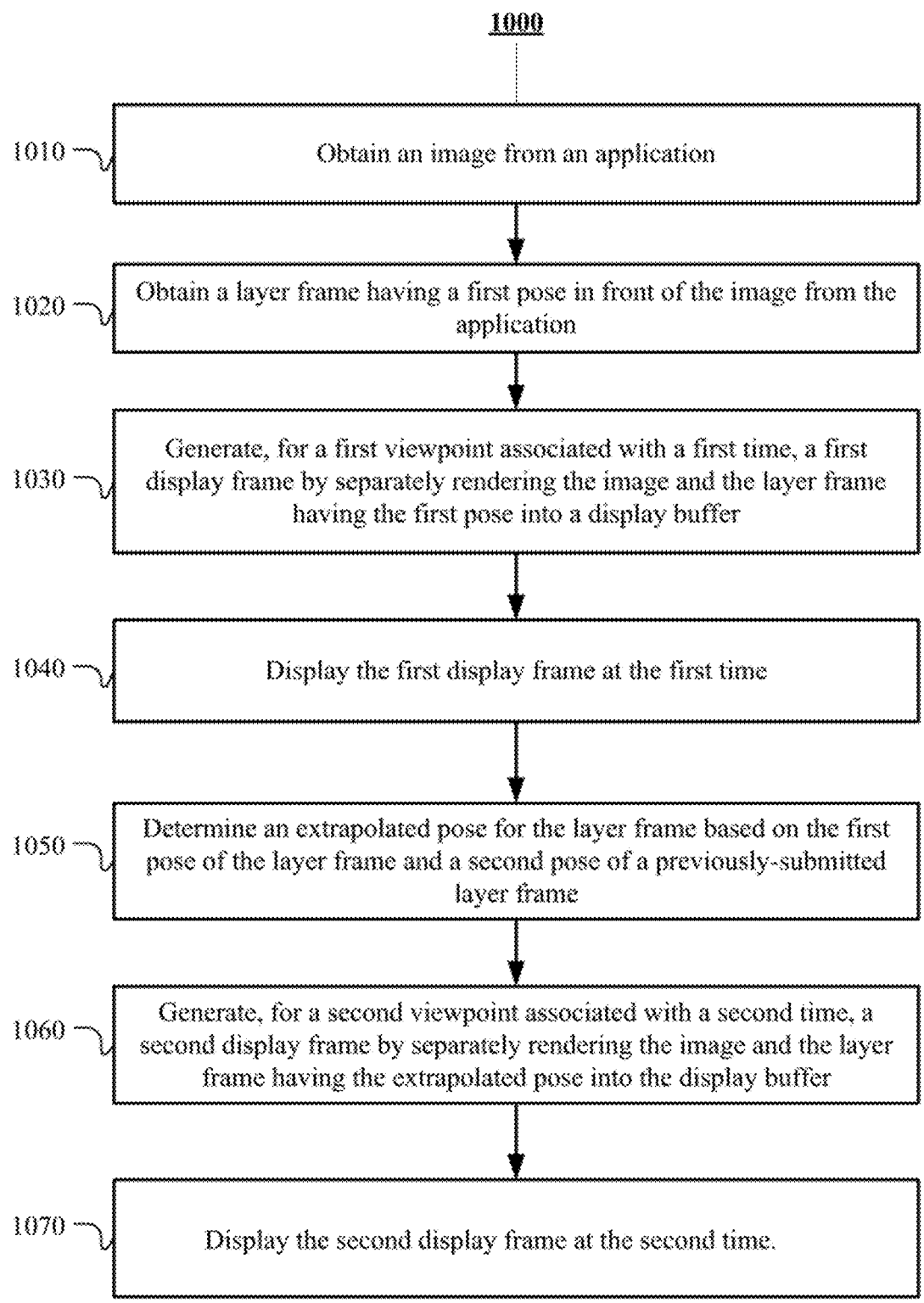
FIG. 10 illustrates an example method for displaying an extrapolated compositor layer.

FIG. 10 illustrates an example method 1000 for displaying an extrapolated compositor layer. The method 1000 may begin at step 1010, where the computing system may obtain an image from an application. In particular embodiments, a scene is rendered into the image and stored in an eye buffer. In particular embodiments, the application can be a VR device. At step 1020, the system may obtain a layer frame having a first pose in front of the image from the application. At step 1030, the system may generate, for a first viewpoint associated with a first time, a first display frame by separately rendering the image and the layer frame having the first pose into a display buffer. The head of the user associated with the application can move a little by the time the image is displayed at time N. Therefore, the eye buffer manager 210 can apply ATW to adjust the obtained image to account for head rotation and warp the obtained image to correct geometric distortion caused by the artificial reality lens. The layer frame buffer manager 250 can apply ATW to adjust the obtained layer frame having the first pose to account for head rotation and warp the obtained layer frame to correct geometric distortion caused by the artificial reality lens. At step 1040, the system may display the first display frame at the first time frame. The first time frame can be frame N.

At step 1050, the system may determine an extrapolated pose for the layer frame based on the first pose of the layer frame and a second pose of a previously-submitted layer frame. The layer frame manager 250 can apply a linear extrapolation algorithm to extrapolate the pose of the layer frame for time N+1 based on two or more previously submitted poses of the layer frame, such as poses at time M and M−1. For example, the layer frame manager 250 can use a linear extrapolation function to implement smooth lerping on orientation and linear lerping on position between two poses. At step 1060, the system may generate, for a second viewpoint associated with a second time, a second display frame by separately rendering the image and the layer frame having the extrapolated pose into the display buffer. At step 1070, the system may display the second display frame at the second time. The second time frame can be time frame N+1.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for displaying an extrapolated compositor layer including the particular steps of the method of FIG. 10, this disclosure contemplates any suitable method for displaying an extrapolated compositor layer including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
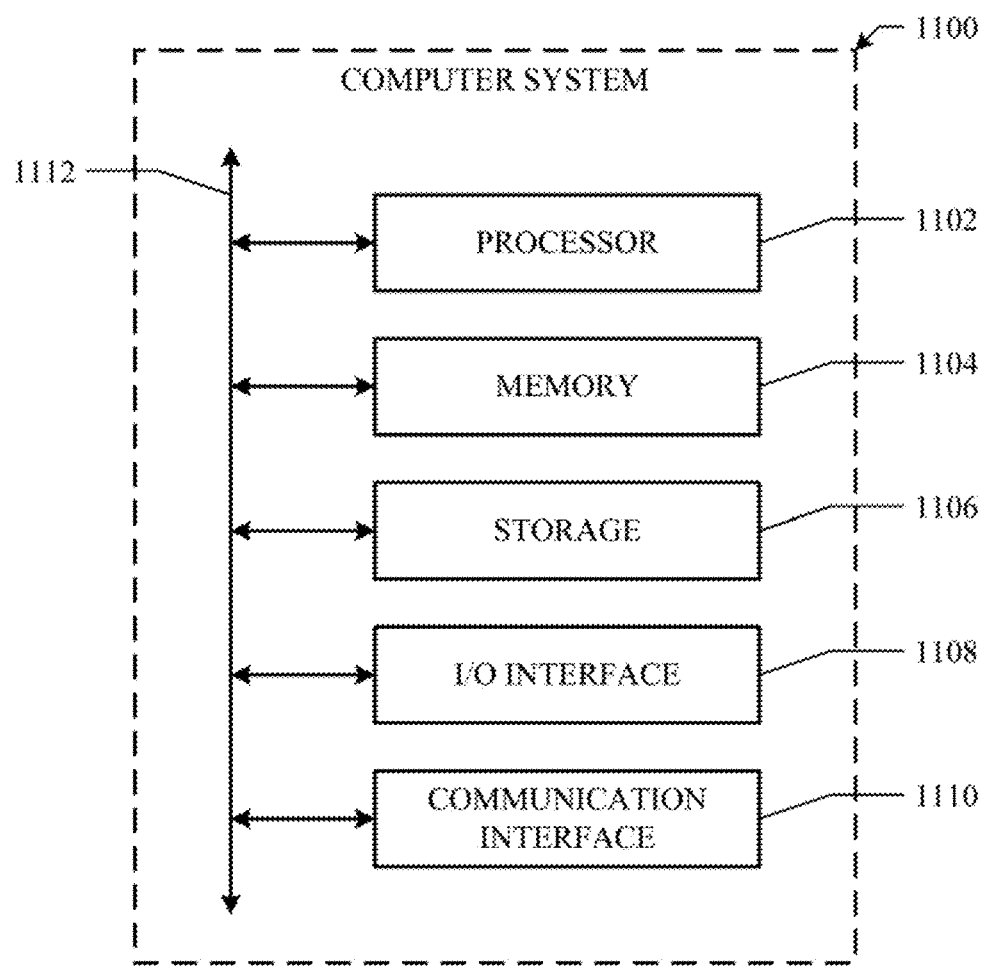
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-onmodule (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of an artificial reality device:
   obtaining, from an application, (a) an image including an object at a first position and (b) a layer frame having a first pose in front of the image, wherein the image and the layer frame are distinct;
   generating, for a first viewpoint associated with a first time, a first display frame by separately:
      rendering the image including the object at the first position into a display buffer; and
      rendering the layer frame having the first pose into the display buffer;

displaying, at an artificial reality lens, the first display frame at the first time;

determining an extrapolated pose for the layer frame based on the first pose of the layer frame and a second pose of a previously submitted layer frame;

determining an extrapolated position of the object in the image based on a motion vector of the object, wherein the motion vector of the object is based on a comparison between one or more pixels of the object at the first position in the image and one or more corresponding pixels of the object at a previous position in a previously submitted image;

warping the layer frame having the extrapolated pose into a warped layer frame having the extrapolated pose and warping the image including the object at the extrapolated position into a warped image including the object at the extrapolated position to account for geometric distortion caused by the artificial reality lens;

after warping the layer frame and warping the image to account for geometric distortion caused by the artificial reality lens, generating, for a second viewpoint associated with a second time, a second display frame by separately:
rendering the warped image including the object at the extrapolated position into the display buffer; and
rendering the warped layer frame having the extrapolated pose into the display buffer; and displaying, at the artificial reality lens, the second display frame at the second time.

2. The method of claim 1, further comprising:
applying, for the first viewpoint associated with the first time, Asynchronous TimeWarp (ATW) to the image including the object at the first position to adjust for head rotation before rendering the image including the object at the first position into the display buffer; and
warping, for the first viewpoint associated with the first time, the image including the object at the first position into a warped image including the object at the first position to account for geometric distortion caused by the artificial reality lens before rendering the warped image including the object at the first position into the display buffer.

3. The method of claim 1, further comprising:
applying, for the first viewpoint associated with the first time, ATW to the layer frame having the first pose to adjust for head rotation before rendering the layer frame having the first pose into the display buffer; and
warping, for the first viewpoint associated with the first time, the layer frame having the first pose into a warped layer frame having the first pose to account for geometric distortion caused by the artificial reality lens before rendering the warped layer frame having the first pose into the display buffer.

4. The method of claim 1, wherein the extrapolated pose of the layer frame is determined using a linear extrapolation algorithm based on the second time, the first pose and the first time of the layer frame, and the second pose and a corresponding time of a previously submitted layer frame.

5. The method of claim 1, further comprising:
applying, for the second viewpoint associated with the second time, ATW to the image including the object at the extrapolated position to adjust for head rotation before warping the image including the object at the extrapolated position.

6. The method of claim 1, wherein determining the extrapolated position of the object in the image based on the motion vector of the object includes moving the object in the image linearly according to the motion vector to account for object movements.

7. The method of claim 1, further comprising:
applying, for the second viewpoint associated with the second time, ATW to the layer frame having the extrapolated pose to adjust for head rotation before warping the layer frame having the extrapolated pose.

8. The method of claim 1, wherein the first time is rendered at half of a desired frame rate and the second time is an extrapolated in-between time frame.

9. The method of claim 1, wherein:
the first and second display frames are displayed on a quad layer, and
the first and second display frames are displayed on a cylindrical layer.

10. The method of claim 1, wherein:
the extrapolated pose is determined by a position and an orientation of a first space in a second space,
the position determines the translation between the first and second spaces, and
the orientation determines the rotation between the first and second spaces.

11. One or more computer-readable non-transitory storage media including executable instructions that, when executed by one or more processors, cause the one or more processors to:
obtain, from an application, (a) an image including an object at a first position and (b) a layer frame having a first pose in front of the image, wherein the image and the layer frame are distinct;
cause generation of, for a first viewpoint associated with a first time, a first display frame by separately:
rendering the image including the object at the first position into a display buffer; and
rendering the layer frame having the first pose into the display buffer;
cause display, at an artificial reality lens, of the first display frame at the first time;
determine an extrapolated pose for the layer frame based on the first pose of the layer frame and a second pose of a previously submitted layer frame;
determine an extrapolated position of the object in the image based on a motion vector of the object, wherein the motion vector of the object is based on a comparison between one or more pixels of the object at the first position in the image and one or more corresponding pixels of the object at a previous position in a previously submitted image;
cause warping of the layer frame having the extrapolated pose into a warped layer frame having the extrapolated pose and warping of the image including the object at the extrapolated position into a warped image including the object at the extrapolated position to account for geometric distortion caused by the artificial reality lens;
after warping the layer frame and warping the image to account for geometric distortion caused by the artificial reality lens, cause generation of, for a second viewpoint associated with a second time, a second display frame by separately:
rendering the warped image including the object at the extrapolated position into the display buffer; and
rendering the warped layer frame having the extrapolated pose into the display buffer; and
cause display, at the artificial reality lens, of the second display frame at the second time.

12. The one or more computer-readable non-transitory storage media of claim 11, wherein the executable instructions that further cause the one or more processors to:
cause application of, for the first viewpoint associated with the first time, Asynchronous TimeWarp (ATW) to the image including the object at the first position to adjust for head rotation before rendering the image including the object at the first position into the display buffer; and
cause warping of, for the first viewpoint associated with the first time, the image including the object at the first position into a warped image including the object at the first position to account for geometric distortion caused by the artificial reality lens before rendering the warped image including the object at the first position into the display buffer.

13. The one or more computer-readable non-transitory storage media of claim 11, wherein the executable instructions that further cause the one or more processors to:
cause application of, for the first viewpoint associated with the first time, ATW to the layer frame having the first pose to adjust for head rotation before rendering the layer frame having the first pose into the display buffer; and
cause warping of, for the first viewpoint associated with the first time, the layer frame having the first pose into a warped layer frame having the first pose to account for geometric distortion caused by the artificial reality lens before rendering the warped layer frame having the first pose into the display buffer.

14. The one or more computer-readable non-transitory storage media of claim 11, wherein the extrapolated pose of the layer frame is determined using a linear extrapolation algorithm based on the second time, the first pose and the first time of the layer frame, and the second pose and corresponding time of a previously submitted layer frame.

15. The one or more computer-readable non-transitory storage media of claim 11, wherein the executable instructions that further cause the one or more processors to:
cause application of, for the second viewpoint associated with the second time, ATW to the image including the object at the extrapolated position to adjust for head rotation before warping the image including the object at the extrapolated position.

16. The one or more computer-readable non-transitory storage media of claim 11, wherein determining the extrapolated position of the object in the image based on the motion vector of the object includes moving the object in the image linearly according to the motion vector to account for object movements.

17. The one or more computer-readable non-transitory storage media of claim 11, wherein the executable instructions that further cause the one or more processors to:
cause application of, for the second viewpoint associated with the second time, ATW to the layer frame having the extrapolated pose to adjust for head rotation before warping the layer frame having the extrapolated pose.

18. The one or more computer-readable non-transitory storage media of claim 11, wherein:
the first time is rendered at half of a desired frame rate and the second time is an extrapolated in-between time frame,
the first and second display frames are displayed on a quad layer, and
the first and second display frames are displayed on a cylindrical layer.

19. The one or more computer-readable non-transitory storage media of claim 11, wherein:
the extrapolated pose is determined by a position and an orientation of a first space in a second space,
the position determines the translation between the first and second spaces, and
the orientation determines the rotation between the first and second spaces.

20. A system comprising:
one or more processors; and
one or more computer-readable non-transitory storage media coupled to one or more of the processors and comprising instructions operable when executed by one or more of the processors to cause the system to:
obtain, from an application, (a) an image including an object at a first position and (b) a layer frame having a first pose in front of the image, wherein the image and the layer frame are distinct;
generate, for a first viewpoint associated with a first time, a first display frame by separately:
rendering the image including the object at the first position into a display buffer; and
rendering the layer frame having the first pose into the display buffer;
display, at an artificial reality lens, the first display frame at the first time;
determine an extrapolated pose for the layer frame based on the first pose of the layer frame and a second pose of a previously submitted layer frame;
determine an extrapolated position of the object in the image based on a motion vector of the object, wherein the motion vector of the object is based on a comparison between one or more pixels of the object at the first position in the image and one or more corresponding pixels of the object at a previous position in a previously submitted image;
warp the layer frame having the extrapolated pose into a warped layer frame having the extrapolated pose and warp the image including the object at the extrapolated position into a warped image including the object at the extrapolated position to account for geometric distortion caused by the artificial reality lens;
after warping the layer frame and warping the image to account for geometric distortion caused by the artificial reality lens, generate, for a second viewpoint associated with a second time, a second display frame by separately:
rendering the warped image including the object at the extrapolated position into the display buffer; and
rendering the warped layer frame having the extrapolated pose into the display buffer; and
display, at the artificial reality lens, the second display frame at the second time.

* * * * *